United States Patent
Sipek

(10) Patent No.: US 9,195,668 B2
(45) Date of Patent: Nov. 24, 2015

(54) LOG ACCESS METHOD STORAGE CONTROL APPARATUS, ARCHIVE SYSTEM, AND METHOD OF OPERATION

(71) Applicant: BARRACUDA NETWORKS, INC., Campbell, CA (US)

(72) Inventor: Josef Sipek, Ann Arbor, MI (US)

(73) Assignee: Barracuda Networks, Inc., Campbell, CA (US)

( * ) Notice: Subject to any disclaimer, the term of this patent is extended or adjusted under 35 U.S.C. 154(b) by 179 days.

(21) Appl. No.: 13/921,089

(22) Filed: Jun. 18, 2013

(65) Prior Publication Data

US 2014/0372383 A1  Dec. 18, 2014

(51) Int. Cl.
*G06F 17/30* (2006.01)
(52) U.S. Cl.
CPC ............... *G06F 17/30073* (2013.01)

(58) Field of Classification Search
None
See application file for complete search history.

(56) References Cited

U.S. PATENT DOCUMENTS

| 2011/0029376 A1* | 2/2011 | Mills et al. ........... 705/14.43 |
| 2014/0237090 A1* | 8/2014 | Lassen et al. ........... 709/223 |

* cited by examiner

*Primary Examiner* — Rehana Perveen
*Assistant Examiner* — Raheem Hoffler

(57) ABSTRACT

A file shard store includes high performance encoding and compaction circuits. An apparatus and its method of operation avoids duplicate storage of file fragments. A plurality of tables control write operations into a plurality of log segments. Shard keys are transferred to uniquely identify fragments of files which may have been previously stored and associated with one or more of client subscribers. An apparatus comprises a plurality of location/subscription tables, a shard transfer circuit, a storage control circuit, an append-to-log circuit coupled to a large storage array, and a log segment compactor circuit.

11 Claims, 8 Drawing Sheets

LOG ACCESS METHOD STORAGE CONTROL APPARATUS, ARCHIVE SYSTEM, AND METHOD OF OPERATION

RELATED APPLICATIONS

None.

BACKGROUND

It is known that conventional computer storage Backup apparatus deduplicate files by recognizing hashes of shards of binary objects. It is known that backup services operating off a wide area network use pattern recognition to de-dup data transfer over the Internet. Cloud-based storage services grow at increasingly rapid rates. Improved optimization is needed to scale with demand. Within this patent application we define a shard to be a portion of a binary object. An example of a shard is a one megabyte or less segment of a data file.

Log—Structured file systems have been proposed, evaluated, and deprecated as proposed architectures for file systems. Rosenblum & Ousterhout (1992), ACM Transactions on Computer Systems, vol. 10, no. 1, pp. 26-52, Association for Computing Machinery, February 1992 and Seltzer, et al. (1995). These techniques are insufficient to optimize backup performance.

What is needed is a way to increase the performance of a backup system with very large workload submitted by many remote clients. Backup systems must themselves have effective backup in order to ensure that they are quickly available when the call for client restoration occurs. What is needed is reduced latency for restoring a backup store per se so that it is highly available for its clients.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope.

SUMMARY OF THE INVENTION

Figure 1:
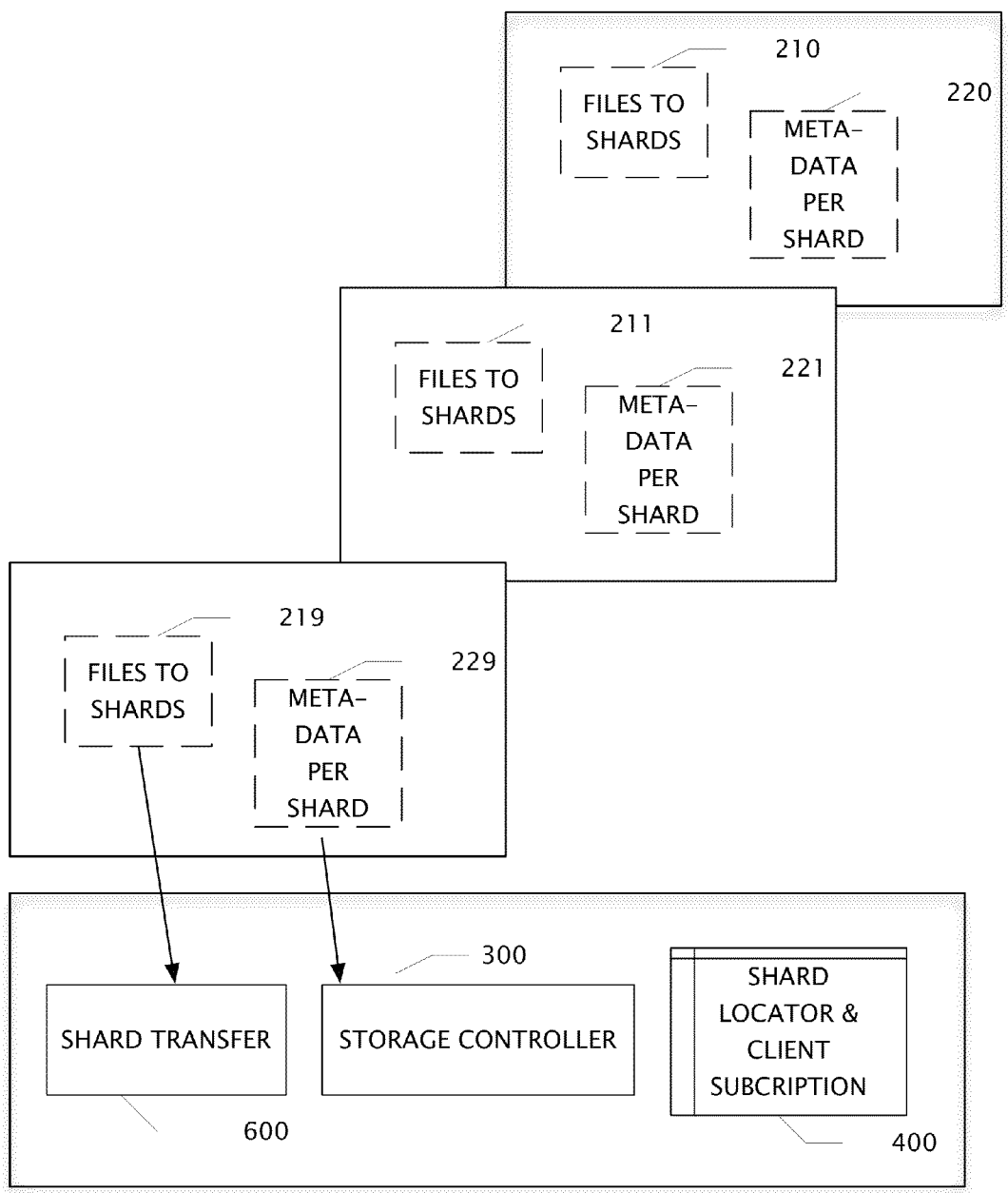
FIG. 1 is an example of a block diagram of the components of a system in support of backup clients.

An archive system includes high performance encoding and compaction circuits. An apparatus and method of operation avoids duplicate storage of file fragments or shards and higher performance than conventional offline file backup products. A plurality of tables control write operations into a plurality of log segments. Shard keys are received which uniquely identify fragments of files which may have been previously stored and associated with one or more of client subscribers. That is, a shard may be found in two files which each belong to a different client subscriber. When either file is requested, the same shard will be retrieved. An apparatus comprises a plurality of location/subscription tables, a shard transfer circuit, a storage control circuit, an append-to-log circuit coupled to a large storage array, and one or more log segment compactor circuits.

An apparatus appends a client id to a log for each shard stored in the array. A table kept in memory is checked to determine when a shard transfer is necessary for backup. When all the clients subscribing to shard have been removed from the log, the shard may be eliminated when convenient to recover the space for reuse.

To improve write performance, meta data is appended to the end of a first log segment while a shard is appended to the end of a second log segment.

To ensure robustness and replay performance, when shard location and client subscription data are stored to one of a plurality of tables, a digest is simultaneously stored to non-transitory computer readable storage. The tables, if lost or corrupted, may be restored from the non-transitory store by a plurality of threads which individually adapt to the latency of non-transitory storage.

DETAILED DISCLOSURE OF EMBODIMENTS

When binary objects or files are broken into shards, a circuit determines metadata for each shard that uniquely identifies it. It may be that one user has many files that contain an identical shard. It may be that a shard may be found in files which belong to many users. When metadata is received from a user, a storage controller determines from a shard locator and client subscription table if the shard has been previously stored and by whom. It may be the case that only the client id needs to be added if the shard has been previously received and stored to the log. In another case, a shard is determined from the shard locator to be new and it is appended to the log and the location in the log is stored in the shard locator and client subscription table which allows retrieval.

When a user deletes a file, his client id is removed from all the shards of that file in the shard locator and client subscription table. From time to time, a log compactor circuit reads a log, and writes it back to non-transitory store except for the shards which have no remaining subscribers. To improve performance, a log may be segmented. When a segment is filled, a summary digest is written at the end of the segment which contains all the adds and deletes to that log segment in one place. This also improves performance by enabling the log compactor to read from a first log segment and write to a second log segment.

If for any reason the shard locator and client subscription table becomes lost or corrupted, it can be recreated from reading a summary digest rather that having to read an entire log segment. Performance can be improved by having a plurality of shard locator & client subscription tables and a plurality of log segments.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Referring to FIG. 1, a system diagram one embodiment of the invention in support of backup clients. A plurality of backup clients each contain a circuit to break up files to shards 210-219. Each of the backup clients further contains a circuit to determine metadata for each of the shards 220-229. The metadata is transmitted to a storage controller of the claimed invention. The storage controller 300 may write an additional client ID into the storage locator & client subscription table 400 if the shard has already been archived. The storage controller may request the shard from the client, append it to a log, and store the location and client ID into the table when a disk write is "done".

Figure 2:
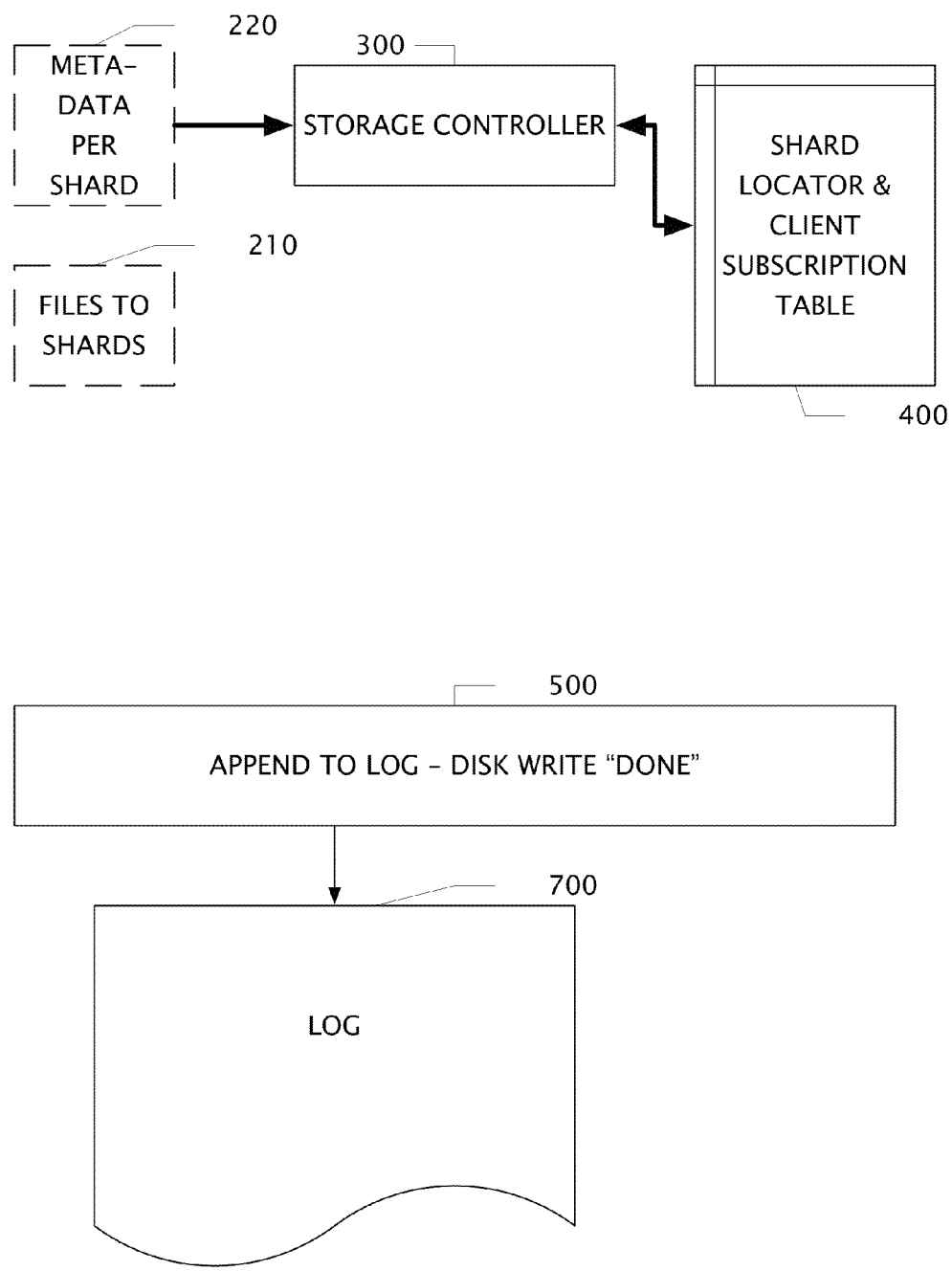
FIG. 2 shows an example of an apparatus for improved efficiency and capacity for backing up files from a plurality of clients.

Referring now to FIG. 2, an apparatus for improved efficiency and capacity for backing up files from a plurality of clients is optimized for de-duplication. A log 700 comprising a non-transitory computer readable medium such as a disk is coupled to a circuit configured to append to the log 500 and further configured to acknowledge success when completed. Files have been converted to one or more shards in an external circuit 210 of a client. Each shard has been analyzed for meta-data including a key in an external circuit 220 of a client. For every shard stored in a location within the log, a table 400 contains meta-data such as the key, the location, and at least one id of a client. The apparatus comprises a meta-data table coupled to a storage control circuit 300 which is coupled to an external source of meta-data for shards. When the storage control circuit determines that a backup for a client contains a shard already stored in the log and already associated with the same client, then nothing needs to be written to the log or to the meta-data table. The shard does not need to be transferred during this backup for success. The apparatus may confirm that backup is successful for these shards for this client.

Figure 3:
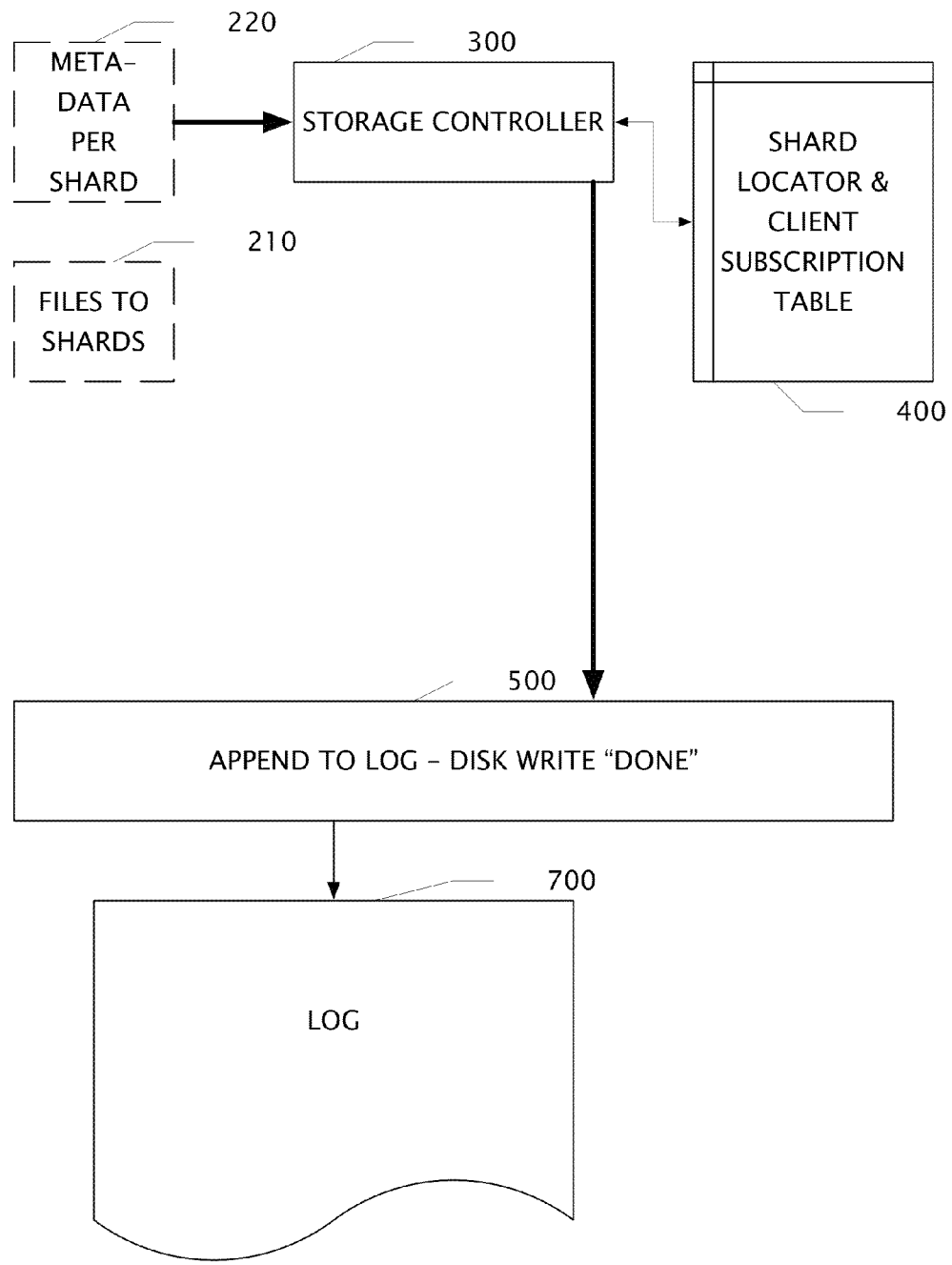
FIG. 3 shows an example of an apparatus that comprises a log controlled by an append to log circuit configured to receive and store meta-data.

Referring now to FIG. 3, the apparatus comprises a log 700 comprising a non-transitory computer readable medium, controlled by an append to log circuit 500 configured to receive and store meta-data and acknowledge when the store has succeeded such as a disk write "done" signal. When a storage control circuit 300 receives a key for a shard it may determine from the table that while the shard is already stored it is now referenced by a new client. In that event it writes a new record reflecting the dependency. In an embodiment, a reference count for the shard may be incremented. In an embodiment, the client ID is added. Both the log and the table are written to with the new client ID.

Figure 4:
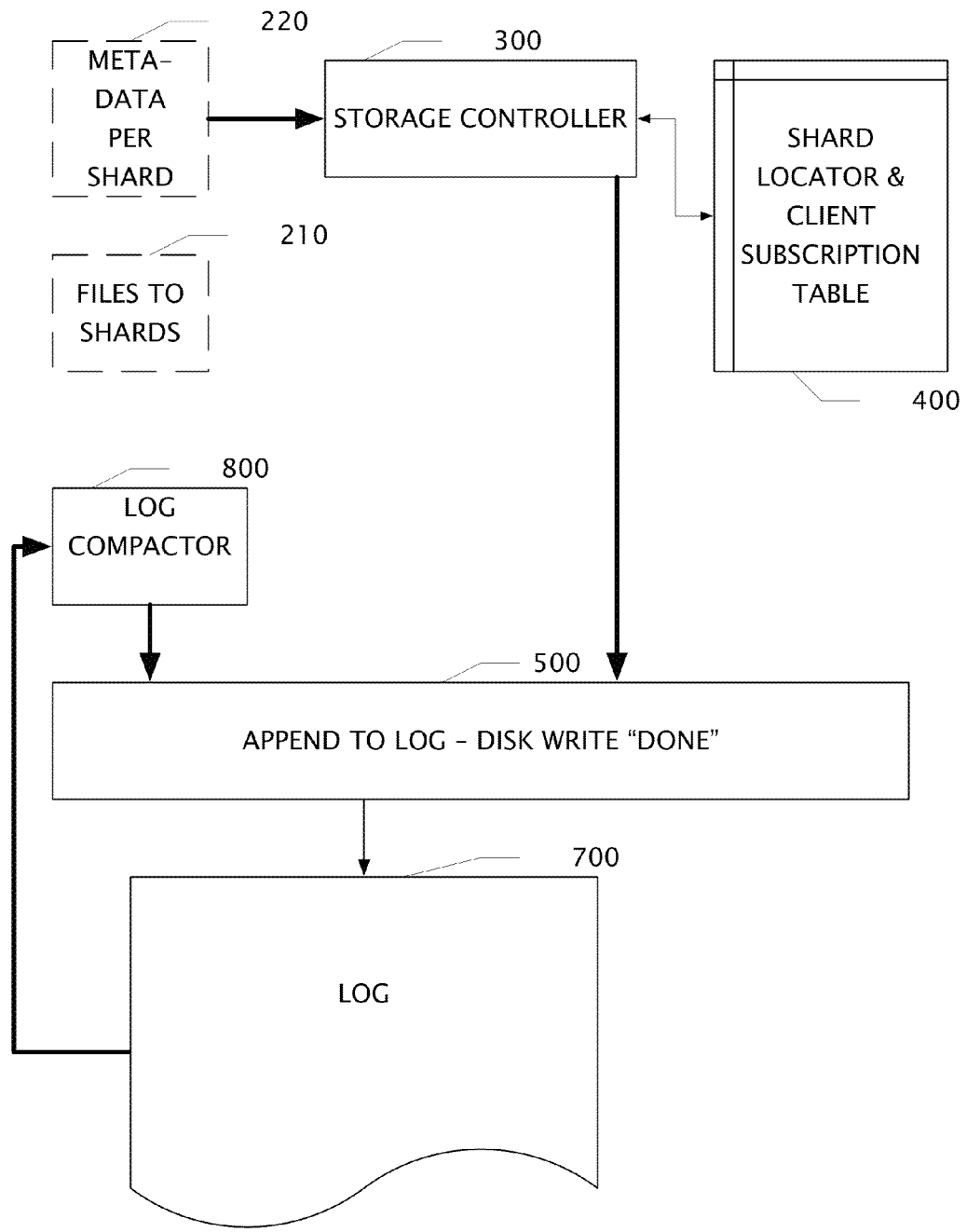
FIG. 4 shows an example of an apparatus that further includes a log compactor circuit.

Referring now to FIG. 4, the apparatus further includes a log compactor circuit 800. When the storage control circuit 300 determines that a shard is no longer needed by one of its owners, e.g. a file has been deleted from one client machine, it writes new record for that shard. This includes, in an embodiment, decrementing the reference count for the shard or simply removing the client ID. When the reference count for a shard is decremented to zero or the array of client ID's becomes empty, the log compactor may omit it when writing to the top of the shard log since no one needs it anymore. The metadata in the table reflects the metadata in the log.

Figure 5:
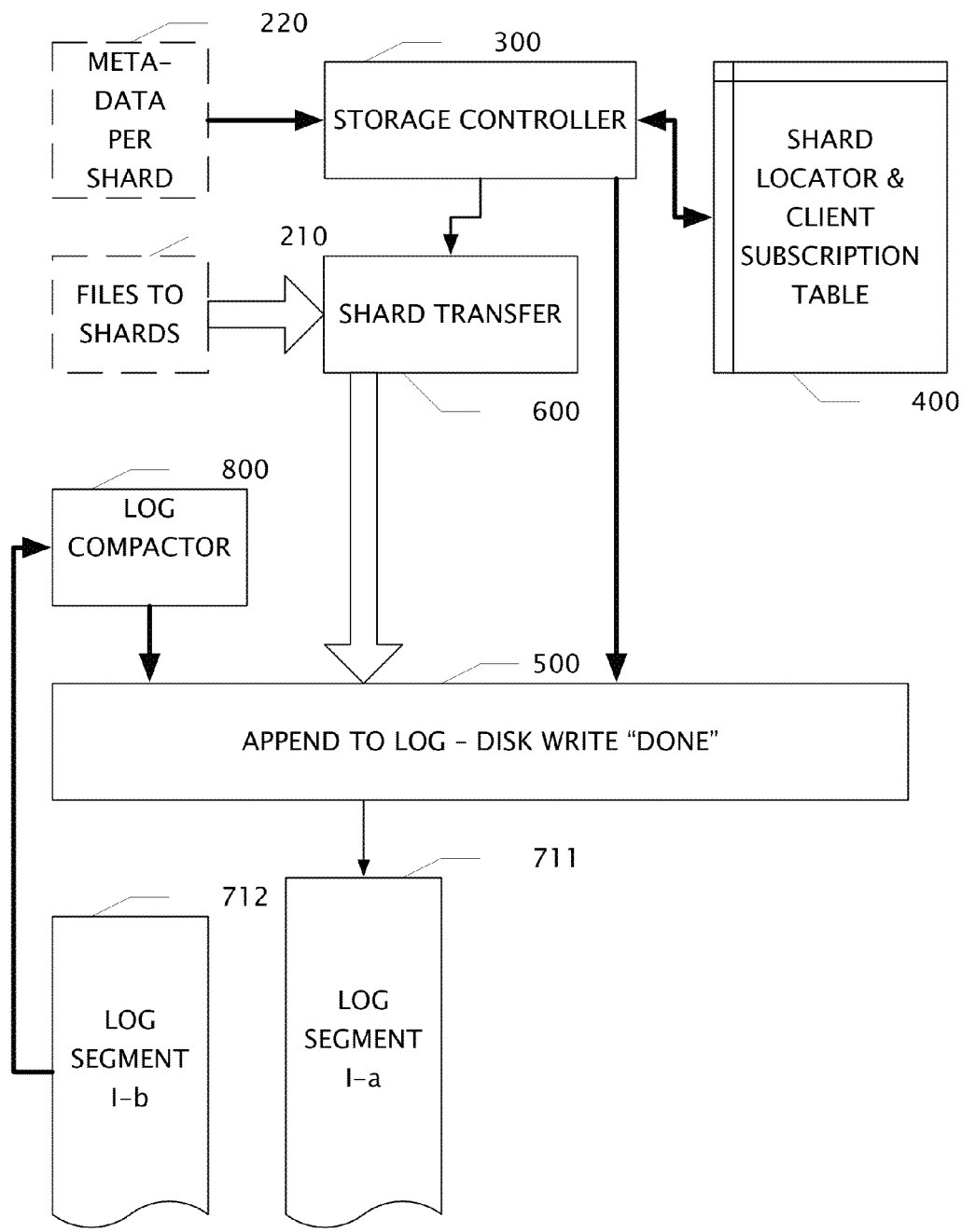
FIG. 5 shows an example of an apparatus that further includes a shard transfer circuit communicatively coupled to a source of shards.

Referring now to FIG. 5, the apparatus further includes a shard transfer circuit communicatively coupled to a source of shards 210 and coupled to the append to log circuit 500 and controlled by the storage control circuit 300. When the storage control circuit determines from examining the meta-data table that a shard is not stored in the log, it controls the shard transfer circuit 600 to obtain the shard, store it, and wait for confirmation that the disk write has been successful and the location. The storage control circuit transmits new metadata to be stored into the log and upon success updates the metadata table. When a shard is first stored into the log, its metadata includes the client ID.

In an embodiment for efficiency improvement the log is separated into a log segment I-a 711 which is written to and a log segment I-b which is read from by the log compactor 800. This allows segregation of read activity from write activity. Under most circumstances write activity dominates because restores are rare.

Figure 6:
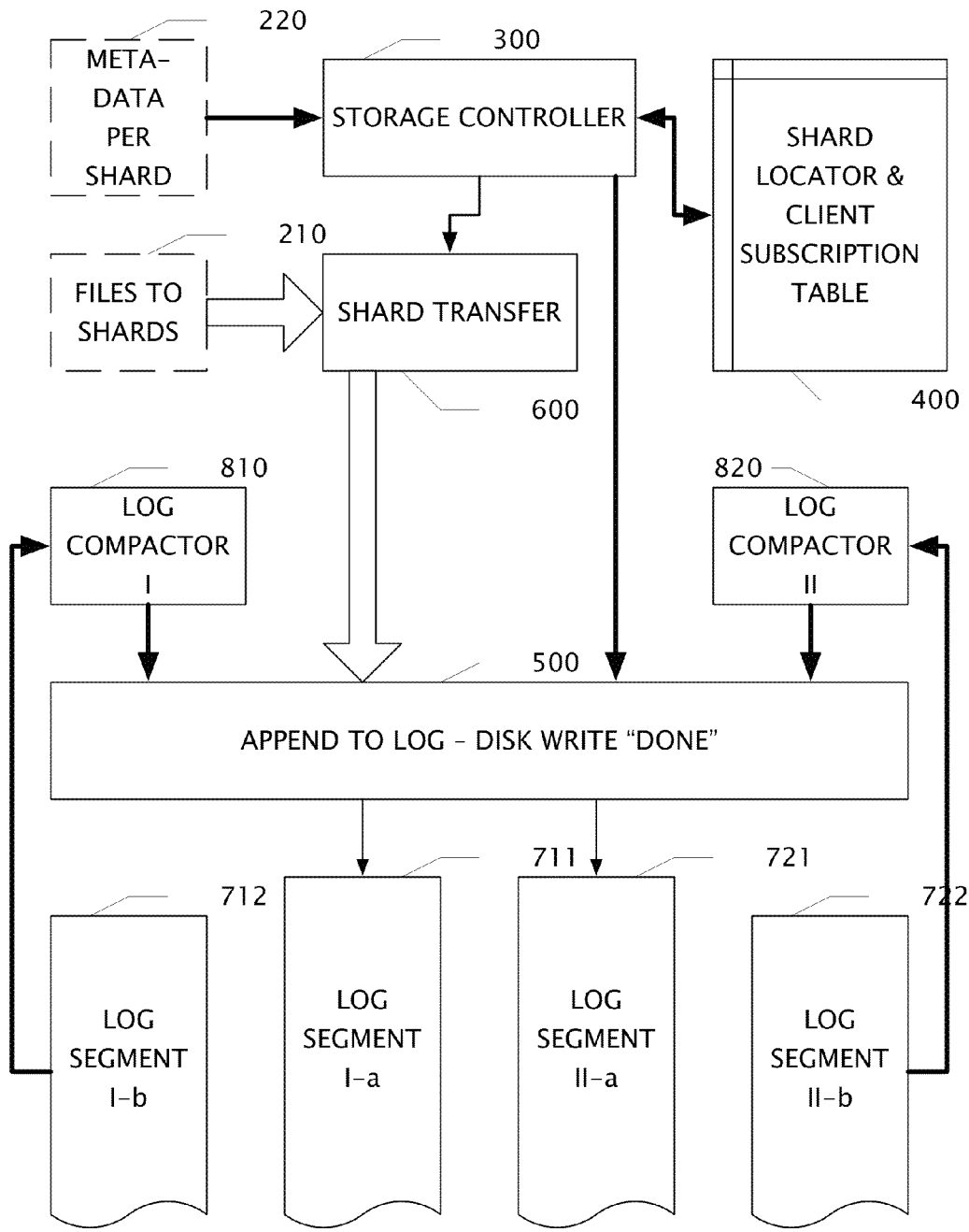
FIG. 6 shows an example of an apparatus that further includes a shard log segment I and a metadata log segment II.

Referring now to FIG. 6, in an embodiment, efficiency of appending to the log is improved by separating the log into a shard log segment I 711 and a metadata log segment II 721. In a further efficiency improvement the metadata log is further separated into a II-b segment which is read by a log compactor II 820 while the results of the compactor is combined with other metadata and written into metadata log segment II-a. Thus log segment II-b is sequentially read from while log segment II-a is sequentially written to.

Figure 7:
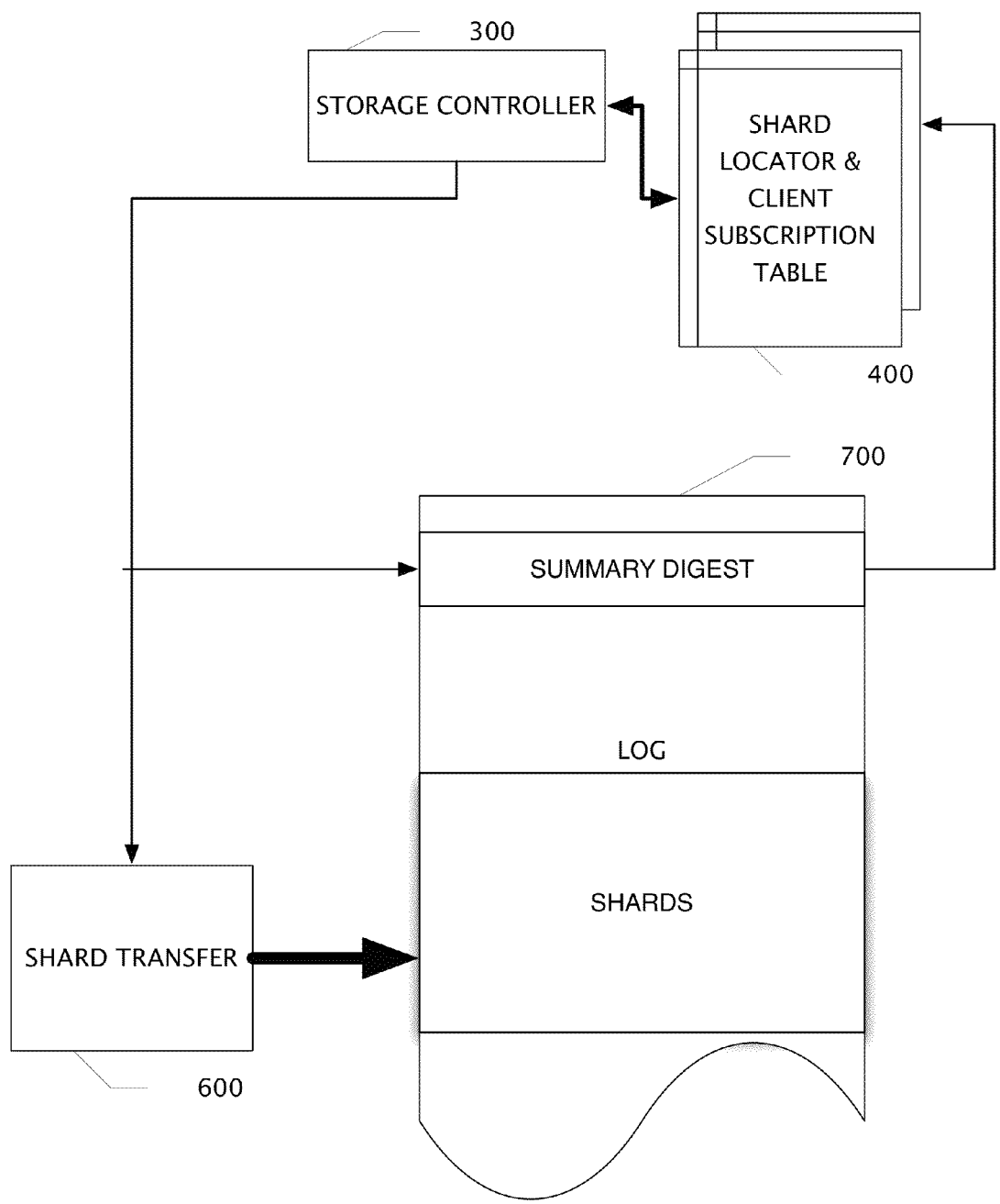
FIG. 7 is an example of a representation of storage addresses which are written into with digests of the information being updated in a plurality of shard locator and client subscription tables.

FIG. 7 is a representation of storage addresses which are written into with digests of the information being updated in a plurality of shard locator and client subscription tables. Multi-threading transformation of the digest store to the shard locator and client subscription store enables rapid recovery from faults.

Figure 8:
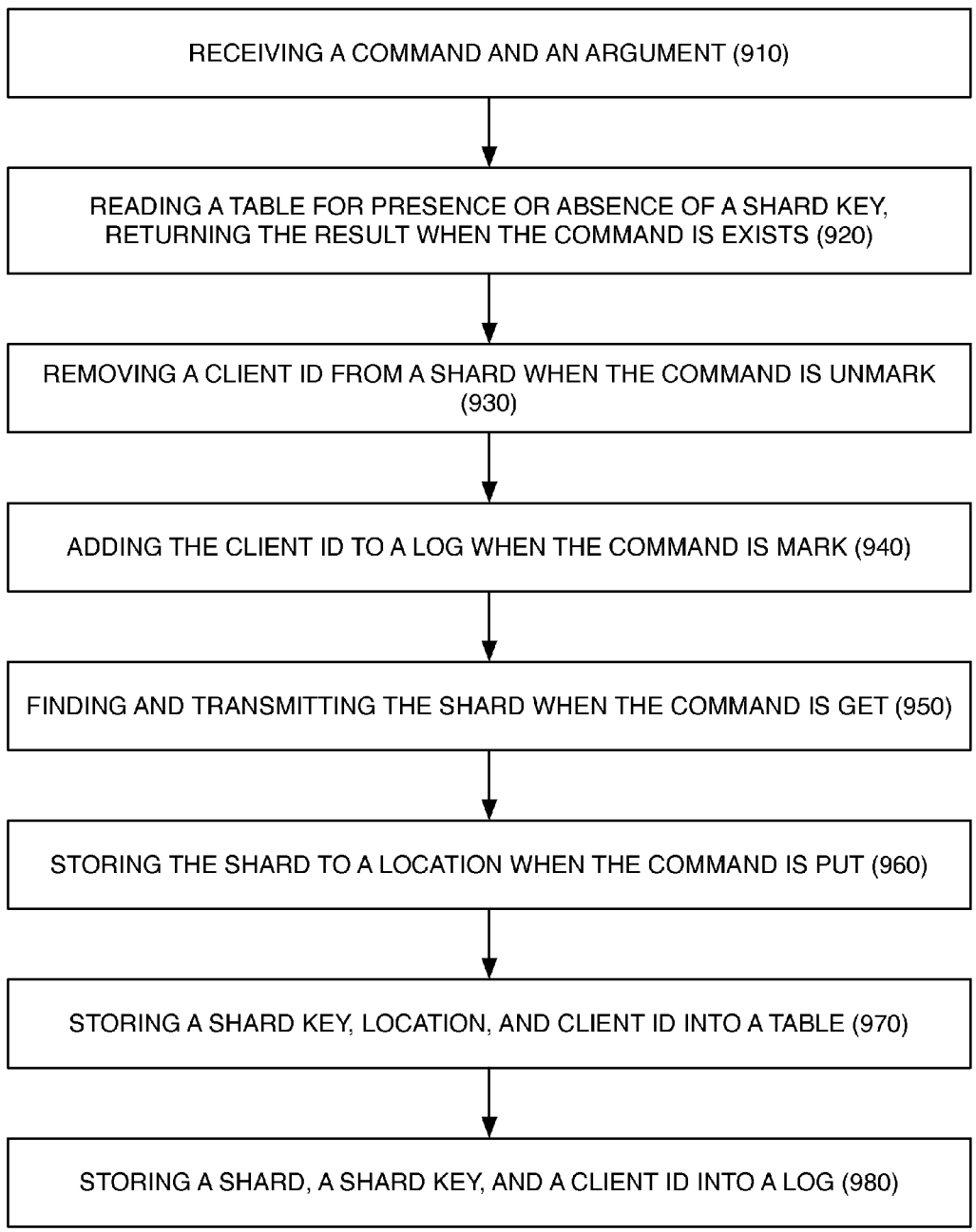
FIG. 8 is an example of a flowchart of a method for operation of a storage control apparatus, which uses a log access method.

Referring now to FIG. 8, another aspect of the invention is a method for operating an Log Access Method Storage Control Apparatus comprising: receiving a command and an argument from a transmitting client 910, when the command is Exists and the argument is a shard key, reading a table for presence or absence of the shard key and returning the result to the transmitting client 920; when the command is Unmark, and the argument is a shard key, removing the identity of the transmitting client from a log associated with a shard uniquely associated with the shard key 930; when the command is Mark, and the argument is a shard key, adding the identity of the transmitting client to a log associated with a shard uniquely associated with the shard key; when the command is Get, and the argument is a shard key 940, looking up the location of a shard uniquely associated with the shard key, and transmitting the shard to the transmitting client 950; when the command is Put, and the arguments comprise a shard and a shard key, storing the shard at a location 960; storing the shard key, the location, and an identification of the transmitting client into a table 970, and initializing a log file with at least the shard key and the identification of the transmitting client 980.

CONCLUSION

The present invention can be easily distinguished from conventional file storage and retrieval access methods. Writing is done to at least one log segment by appending to the end which addresses latency. A counter tracks the number of deletions. A log compaction circuit reads a first log segment containing shards which have been deleted and writes into a second log segment in the style of defragging a disk which has empty space between files.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks, non-transitory Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operating a Log Access Method Storage Control Apparatus comprising:
   receiving a command and an argument from a transmitting client,
   when the command is Exists and the argument is a shard key,
   reading a table for presence or absence of the shard key and returning the result to the transmitting client; when the command is Unmark, and the argument is a shard key,
   removing the identity of the transmitting client from a log associated with a shard uniquely associated with the shard key,
   when the command is Mark, and the argument is a shard key,
   adding the identity of the transmitting client to a log associated with a shard uniquely associated with the shard key,
   when the command is Get, and the argument is a shard key,
   looking up a location of a shard uniquely associated with the shard key, and
   transmitting the shard to the transmitting client, when the command is Put, and the arguments comprise a shard and a shard key,
   storing the shard at the location,
   storing the shard key, the location, and an identification of the transmitting client into a table, and
   initializing a log file with at least the shard key and the identification of the transmitting client.

2. The method of claim 1 further comprising:
   when the command is Get, and the argument is a shard key,
   obtaining the location for each requested shard from a computer readable table, and
   delivering the shard(s) to the client.

3. The method of claim 2 further comprising:
   checking that the client is associated with the shard in the table.

4. The method of claim 1 further comprising:
   sending the transmitting client at least one acknowledgement.

5. The method of claim 4 further comprising:
   determining from a computer readable table that a shard uniquely associated with the shard key is already stored and associated with the transmitting client, wherein the acknowledgement is a success acknowledgement.

6. The method of claim 5 further comprising:
   determining from a computer readable table that a shard uniquely associated with the shard key is already stored but not yet associated with the transmitting client,
   appending to a log file associated with the shard, the additional identification of the transmitting client, and updating the table,
   wherein the acknowledgement is a success acknowledgement.

7. The method of claim 6 further comprising:
   when the command is Unmark, and the argument is a shard key,
   determining from a table that a shard uniquely associated with the shard key is stored and associated with the transmitting client,
   appending to a log file associated with the shard, a recission identification of the transmitting client, and updating the table,
   wherein the acknowledgement is a success acknowledgement.

8. The method of claim 7 further comprising:
   determining from a table that a shard uniquely associated with the shard key is not stored, wherein the first code is a shard transmission request code,
   receiving the shard,
   storing to a location,
   initializing a log file associated with the shard, its location, and the identification of the transmitting client, and updating the table, and
   transmitting a success acknowledgement to the client.

9. The method of claim 1 further comprising;
   writing shard meta data, client subscription, and location data to a file associated with each shard location and client subscription table.

10. The method of claim 1 further comprising:
    reading a file containing shard meta data, client subscription, and location data associated with a log segment.

11. The method of claim 1 further comprising:
    receiving from a requestor a plurality of shard ids and client ids;
    looking up a shard location for each shard on a condition that the client is a subscriber to each of the shard ids;
    retrieving each requested shard; and
    transmitting the retrieved shard to the requestor.

* * * * *